United States Patent Office 2,958,450
Patented Nov. 1, 1960

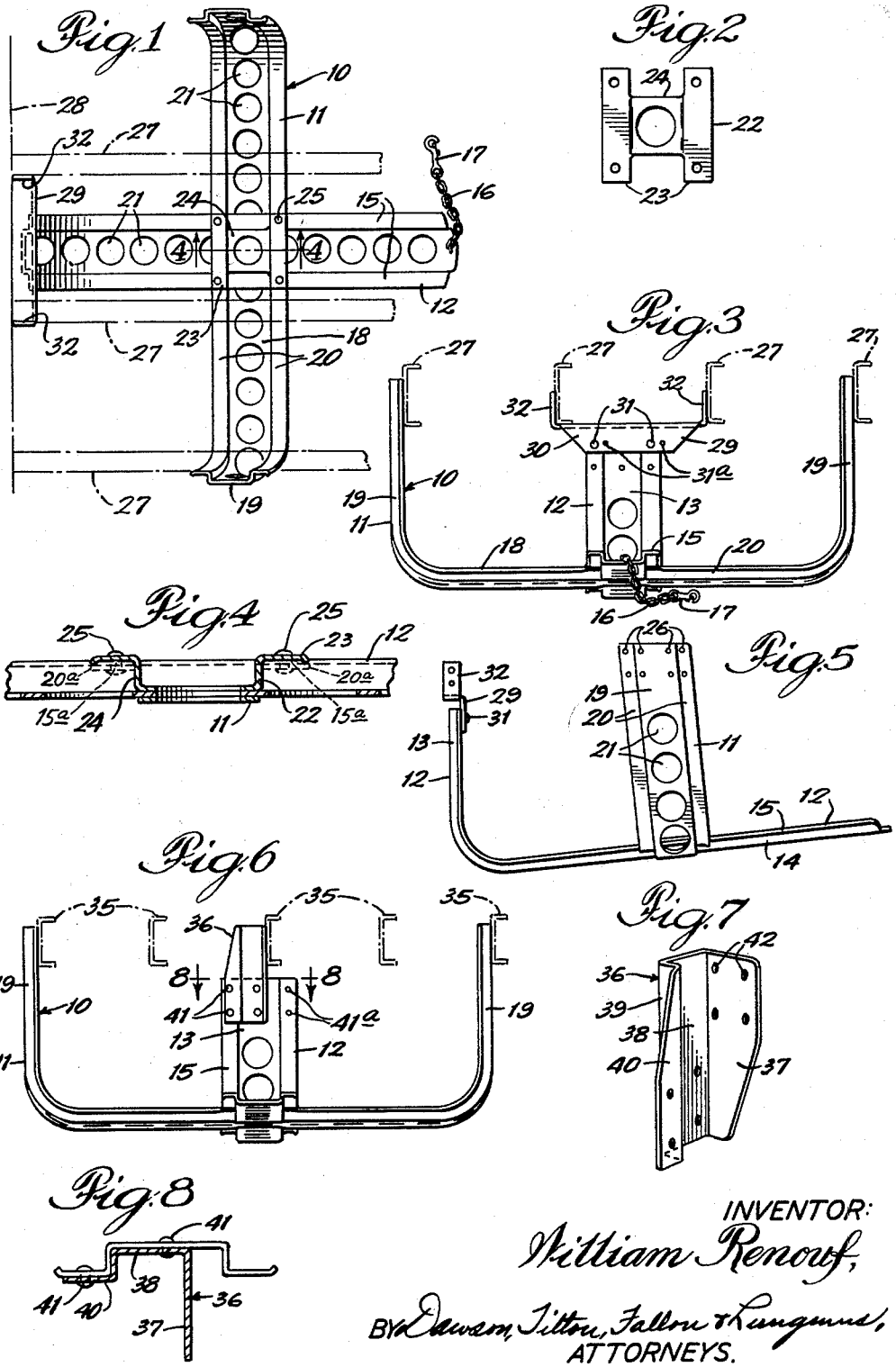

2,958,450

TIRE CARRIER

William Renouf, Kenilworth, Ill., assignor to Nash Bros. Co., Evanston, Ill., a corporation of Delaware Filed July 23, 1957, Ser. No. 673,620

3 Claims. (Cl. 224—42.23)

This invention relates to a tire carrier, and more particularly to an improved slant basket carrier for supporting spare tires below trucks, trailers, etc.

An object of the present invention is to provide a rigid tire carrier of light weight which is particularly suitable for use in connection with trucks or trailers having spaced cross-sills. Another object is to provide an improved slant tire basket or rack which may be easily and quickly secured to the spaced frame members of a trailer or truck for suspending a spare tire below the vehicle's frame. A still further object is to provide a tire carrier having a pair of intersecting support members and a third member for reinforcing the intersecting members at their point of connection and for restoring structural continuity to the combination. Yet another object is to provide a slant basket tire carrier having three upstanding arms for providing a rigid connection to the frame members of a trailer or truck.

Other objects will appear from the specification and drawings in which:

Figure 1 is a top plan view of a slant basket tire carrier embodying the present invention; Figure 2 is an enlarged top plan view of the reinforcing member; Figure 3 is a front view of the carrier in elevation; Figure 4 is an enlarged broken sectional view taken along line 4—4 of Figure 1; Figure 5 is a side elevational view of the carrier; Figure 6 is a front elevational view showing a modification of the carrier illustrated in Figures 1–5, Figure 7 is an enlarged perspective view of the modified connecting bracket; and Figure 8 is an enlarged sectional view taken along line 8—8 of Figure 6.

Referring to the drawings, the numeral 10 generally designates a slant basket spare tire carrier having a pair of intersecting support members or straps 11 and 12. The central support member 12 has a generally L-shaped configuration with an upstanding rear arm 13 and a forwardly and upwardly inclined lower portion or section 14. As illustrated most clearly in Figures 1 and 3, member 12 has a generally U-shaped cross-section and is provided with outwardly turned flanges 15 which define spaced parallel tracks for inserting and supporting a tire within the basket. At the free end of the L-shaped support member is a chain 16 and snap 17 for securing a spare tire firmly within the carrier.

In Figure 3 it will be seen that the single cross strap or support member 11 has a generally U-shaped configuration, being provided with a generally horizontal portion 18 and a pair of upwardly extending arms 19. Like the central member 12, the U-shaped strap 11 has a channel cross section and is provided with outwardly turned flanges 20. The intermediate base portion or section of the strap 11 is recessed to receive the intermediate portion of the L-shaped member's lower leg, the bottom stretch of the cross member passing below the lower leg of the central member (Figures 4 and 5) to provide a sling for supporting a tire. In other words, only the side walls and flanges of the U-shaped member are cut away to provide a recess for snugly receiving an intermediate portion of the L-shaped member's lower arm, the flanges of the L-shaped member thereby extending over the flanges of the U-shaped member adjacent the recess. In the drawings, the overlying flange portions of the L-shaped member are designated by the numeral 15a while the flange portions of the U-shaped strap disposed therebeneath are designated by the numeral 20a. Preferably, both the central member and the U-shaped member are provided with openings 21 arranged in series for lightening the structure without substantially affecting its strength.

At the junction or intersection of the two support members I provide a union or insert member 22 which is shown most clearly in Figures 2 and 4. The union has a pair of side flanges 23 and a U-shaped intermediate portion 24 corresponding with the cross sectional configuration of the cross strap 11. The intermediate portion of the union fits snugly within the channel defined by the central L-shaped strap 12 and the end portions of flanges 23 overlap flange portions 15a which in turn overlie flange portions 20a (Fig. 4). Rivets 25 project through the superimposed flange portions 20a, 15a and flanges 23 of the cross strap, central strap and union and securely join these members together. It will be understood, of course, that bolts or other suitable connecting means may be substituted for rivets 25. In Figure 4 it will be seen that the edges of union flanges 23 are rounded so that these flanges will not interfere with sliding movement of a tire along flanges or tracks 15.

Each arm 19 of U-shaped strap 11 is provided at its upper end with a plurality of apertures 26 for attaching member 11 to the spaced cross-sills of a trailer. These cross-sills are represented by broken lines 27 in the drawings, the line 28 indicating the longitudinal center line of the trailer. Thus, the opposite ends of the U-shaped strap may be securely bolted or riveted to spaced cross-sills of the trailer. It is to be noted that apertures 26 are provided in both the outwardly-turned flanges 21 and the inner portions of the cross-strap disposed between those flanges. The placement of these apertures thereby adapts the carrier for attachment to the cross-sills of a trailer regardless of the direction in which the flanges of the cross-sills project. For example, where the cross-sill flanges project to the right, as illustrated in Figure 3, then the left upstanding arm of strap 11 has its flanges 20 in surface engagement with one cross-sill while the other upstanding arm has its inner portion engaging another cross-sill. Should the flanges of the cross-sills face in the opposite direction, then the arrangement would simply be reversed with the apertured flanges of the right arm engaging the right cross-sill while the apertured interior or inner portion of the other arm being affixed to the left cross-sill. Consequently, the carrier may be easily attached to a trailer whether the cross-sill flanges extend rearwardly or forwardly with reference to the longitudinal axis of that trailer. Also, it will be apparent that for the same reasons the carrier may be mounted adjacent either side of a trailer, and, if desired, a pair of carriers may be suspended from the cross-sills at opposite sides thereof.

At the upper end of upstanding arm 13, the L-shaped central member is equipped with a mounting bracket 29. The horizontal bracket has a downwardly turned flange 30 secured to the flanges 14 of arm 13 by rivets 31 or by other suitable means and is also provided with longitudinally spaced upturned ears 32 which are apertured for connection to a pair of adjacent cross-sills 27. In the illustration given, the two rivets 31 project through two of the sides of four openings 31a in the downwardly turned flange of the connecting bracket so that the bracket is disposed slightly to the left for positioning the ears in contact with the intermediate sills.

From Figures 1 and 3 it will be seen that ears 32 lie along transverse planes and that each ear is uniformly spaced between the other ear and a plane passing through the nearest upstanding arm of the U-shaped support member. Therefore, in the embodiment illustrated in Figures 1 through 5, the three suspension arms of the carrier are adapted for connection to a series of four uniformly spaced cross-sills. The three arm suspension thereby provides an extremely sturdy and rigid carrier for supporting spare tires beneath a trailer frame.

The U-shaped union 22 cooperates with the support straps 11 and 12 to connect these members together and to reinforce the recessed cross strap 11. It is to be noted that the intermediate portion of the union snugly fits within the channel defined by the L-strap and tightly clamps the intermediate portion of that strap's lower leg within the recess of the underslung U-shaped member 11. Furthermore, the union restores the structural continuity of the U-shaped cross strap 11 and thereby rigidifies and reinforces the carrier.

The carrier illustrated in Figures 6 through 8 is identical to the structure already described except for the mounting bracket which connects the supstanding rear leg 13 of the L-shaped strap 12 to one of the cross-sills 35 of a trailer. The modified mounting bracket 36 adapts the tire carrier for connection to a trailer having relatively closely spaced cross-sills. For example, the embodiment of Figures 6 through 8 is suitable for use where the cross-sills are spaced twelve inches apart, rather than the usual sixteen inch spacing represented in Figures 1 and 3.

As shown in Figure 7, the mounting bracket 36 is vertically elongated and has a forwardly projecting flange or ear 37 extending along a vertical plane, a rear wall 38, a forwardly projecting side wall 39, and an outwardly turned side flange 40. The rear and side walls, and the side flange 40, follow the cross sectional contour of the central strap, the rear wall 38 being disposed against the upper end portion of the strap 12 within the channel and the side flange 40 extending over one of the flanges 15 of that strap. Rivets 41 rigidly secure the lower portion of the connecting bracket to the upper end portion of the strap's upstanding arm 13 with the bracket projecting upwardly beyond the end of the strap to provide a connection with one of the cross-sills 35. Preferably, the central strap 12 is apertured for connection with either the mounting bracket 36 or the bracket 29 described in connection with the structure illustrated in Figures 1–5.

The forwardly projecting flange 37 of bracket 36 lies along a vertical plane disposed equidistant between the surfaces of the U-shaped support member 11 which are secured in engagement with other cross-sills of the uniformly spaced series. As shown in Figure 7, the upper portion of flange 37 is provided with apertures 42 which receive bolts or other suitable connecting means for rigidly connecting the mounting bracket to the central cross-sill 35.

In the particular illustration given, the flanges of the cross-sills extend towards the right and the upstanding arms 19 of the cross strap, as well as the forwardly projecting flange 37 of bracket 36 engage the left side of those cross-sills. However, where the cross-sill flanges extend to the left, it will be understood that arms 19 will depend from the right sides of the respective sills and in such a case, the central strap 12 will be equipped with a bracket comprising the mirror image of bracket 36 for engaging the right side of the central cross-sill. Thus, a plurality of openings 41a are provided in the upstanding arm of the central step for connection with either the bracket 36 shown in the drawings, or its mirror image.

In placing a tire within the carrier, it is desirable to first stand the tire on the ground or pavement with the upper portion thereof resting against the free end of the L-shaped support member 12. The worker then lifts the lower portion of the tire, pivoting it about its engagement with the end of the support member until the tire lies along a plane substantially parallel with the plane defined by the intersecting lower portions of support members 11 and 12. From this position, the tire may be easily slid into the carrier and supported in flat condition therein. It will be noted that in addition to providing structural rigidity, the uniform U-shaped cross sectional configuration of central strap 12 facilitates the insertion and removal of a tire since the parallel flanges or tracks 15 provide only limited frictional engagement with the tire as it is slid into or out of position within the carrier.

From the foregoing, it will be seen that I have provided a lightweight slant basket tire carrier of extremely rigid construction which is adapted to be suspended by the three upstanding arms of the intersecting support members to the spaced frame members of a trailer or truck. It has been found that a steel basket embodying the present invention weighs only about 31 to 33 pounds, in contrast to earlier baskets weighing upwards of 48 to 50 pounds. It will also be noted that the construction of the carrier permits a number of such carriers to be stacked or superimposed, thereby conserving space and facilitating handling during storage and shipment.

While in the foregoing I have disclosed two embodiments of the present invention in considerable detail for purposes of illustration, it will be understood by those skilled in the art that many of these details may be varied without departing from the spirit and scope of the invention.

I claim:

1. A tire carrier adapted to be secured to a vehicle frame comprising a sling support having a U-shaped metal strap and an L-shaped metal strap, said straps both being U-shaped in cross section and having spaced upstanding side walls terminating in laterally projecting flanges, said L-shaped strap having an upstanding rear arm and a forwardly and upwardly inclined lower arm, said U-shaped strap having a pair of spaced upstanding arms and a substantially horizontal intermediate portion, said intermediate portion of said U-shaped strap having portions of opposing side walls and flanges cut away to provide a recess snugly receiving an intermediate portion of the lower arm of said L-shaped strap, the flanges of the lower arm of said L-shaped member extending over and being securely affixed to the flanges of said U-shaped strap adjacent said recess, said U-shaped strap being secured to said L-shaped strap intermediate the opposite ends of said upwardly inclined lower arm, and an insert member of U-shaped cross section seated and secured within the intermediate portion of said lower arm and extending longitudinally of said intermediate portion of said U-shaped strap.

2. A tire carrier adapted to be secured to a vehicle frame comprising a sling support having a U-shaped metal strap and an L-shaped metal strap, said L-shaped strap having an upstanding rear arm and a forwardly and upwardly inclined lower arm, said U-shaped strap having a pair of spaced upstanding arms and a substantially horizontal intermediate portion, said straps both having U-shaped cross sections and having spaced upstanding side walls terminating in laterally projecting flanges, said intermediate portion of said U-shaped strap having flange and side wall portions cut away to provide a recess snugly receiving an intermediate portion of the lower arm of said L-shaped strap, said flanges of said L-shaped strap extending over the flanges of said U-shaped member adjacent said recess, an insert member of U-shaped cross section seated within the intermediate portion of said lower arm and having flanges superimposed upon the flange portions of said arm extending over the flanges of said U-shaped strap adjacent said recess, and means for securely connecting the superimposed flanges of said insert member, lower arm and U-shaped strap adjacent said recess.

3. A tire carrier adapted to be secured to a vehicle frame comprising a sling support having a U-shaped metal strap and an L-shaped metal strap, said straps both being U-shaped in cross section and having spaced upstanding side walls terminating in laterally projecting flanges, said L-shaped strap having an upstanding rear arm and a forwardly and upwardly inclined lower arm section, said U-shaped strap having a pair of upstanding arms and a substantially horizontal intermediate base section, said base section of said U-shaped strap and said arm section of said L-shaped strap being provided with intermediate intersecting zones, one of said arm and base sections having portions of the opposing side walls and flanges thereof cut away at said intersecting zone to provide a recess snugly receiving the other of said sections, the flanges of said other of said sections overlying the flanges of the recessed section adjacent said recess, an insert member of U-shaped cross section seated within said other section within the intermediate zone thereof and having flanges superimposed upon the flange portions of said other section overlying the flanges of said recessed section adjacent said recess, and means for securely connecting the superimposed flanges of said insert member and said sections adjacent said recess.

References Cited in the file of this patent

UNITED STATES PATENTS

| | | |
|---|---|---|
| 1,032,036 | Walter | July 9, 1912 |
| 1,628,538 | Freeman | May 10, 1927 |
| 2,417,952 | Selzer | Mar. 25, 1947 |
| 2,420,854 | Black | May 20, 1947 |
| 2,449,544 | Ballard | Sept. 21, 1948 |
| 2,489,561 | Clark | Nov. 29, 1949 |
| 2,757,838 | Renouf | Aug. 7, 1956 |